United States Patent [19]

Lewis et al.

[11] Patent Number: 5,084,623
[45] Date of Patent: * Jan. 28, 1992

[54] RADIATION DOSAGE INDICATOR

[75] Inventors: David F. Lewis, Monroe, Conn.; Carl A. Listl, New Hyde Park, N.Y.

[73] Assignee: ISP Investments Inc., Wilmington, Del.

[*] Notice: The portion of the term of this patent subsequent to Sep. 24, 2008 has been disclaimed.

[21] Appl. No.: 652,328

[22] Filed: Feb. 7, 1991

Related U.S. Application Data

[63] Continuation-in-part of Ser. No. 477,585, Feb. 9, 1990.

[51] Int. Cl.$^5$ .................................. G01J 1/50
[52] U.S. Cl. .................................. 250/474.1
[58] Field of Search ............... 250/472.1, 473.1, 474.1

[56] References Cited

U.S. PATENT DOCUMENTS

3,429,433  2/1969  Holt .................. 250/474.1 X
3,787,687  1/1974  Trumble ................. 250/474.1
4,788,433  11/1988 Wright ................. 250/474.1

Primary Examiner—Constantine Hannaher
Assistant Examiner—Edward J. Glick
Attorney, Agent, or Firm—Jules E. Goldberg; Marilyn J. Maue; Joshua J. Ward

[57] ABSTRACT

A multi-ply radiation dosage indicator, and method of manufacture, is disclosed including a first ply having visible indicia thereon and a second ply having a radiation sensitive zone overlying the indicia of the first ply. The radiation sensitive zone is capable of changing opacity in response to exposure to a radiation dosage exceeding a predetermined threshold so as to change the visibility of the indicia thereby providing an indication as to whether the indicator has become irradiated. An optical filter ply may be provided overlying the indicia, and the indicator also may be provided with a transparent protective outer ply. A pressure sensitive adhesive ply having a removable release sheet is employed for attaching the indicator to a substrate.

28 Claims, 4 Drawing Sheets

RADIATION DOSAGE INDICATOR

CROSS-REFERENCE TO RELATED APPLICATIONS

This application is a continuation-in-part of copending application Ser. No. 07/477,585 filed Feb. 9, 1990, the contents of which are incorporated herein by reference.

BACKGROUND OF THE INVENTION

I. Field of the Invention

This invention relates to a radiation dosage indicator, and in particular, to a dosimeter having a radiation sensitive zone capable of changing opacity in response to exposure to radiation to change the visibility of indicia on said indicator, and to the method of manufacturing such indicator.

II. Description of the Prior Art

The use of dosimeters to determine the absorbed dose of ionizing radiation received by the person or the substrate to which it is attached is well known. There are many types of dosimeters, the most common being the air-capacitor dosimeter, the film badge and the thermoluminescent dosimeter.

The air-capacitor dosimeter includes an inside chamber which serves as an ion chamber, and a central collecting electrode. An electric charge is placed on the central electrode. Such dosimeters, when charged, are essentially air-capacitors, and the amount of discharge during use is proportional to the absorbed dose of X-ray or gamma ray radiation received. Inherent in the use of such dosimeters is the need of a power source for applying a voltage between the electrode and the chamber wall.

A film badge dosimeter usually is loaded with one or more film packets. The simplest type of film badge consists of a small paper envelope containing a dental film, one-half of which is surrounded by a thin lead foil. The badge must contain one or more filters so that a comparison can be made of the relative blackening of the developed film from behind the various filters. This comparison reveals the extent of exposure to various types of radiation. Inherent in the use of such badge is the need of a developing process to develop the exposed film.

A thermoluminescent dosimeter is one that functions on the principle of thermoluminescence; that is, the property of certain substances that release light upon heating after they have been exposed to ionizing radiation. Inherent in this type of dosimeter is the need for measuring either the peak intensity of the light emitted or the integrated quantity of light.

While such dosimeters perform satisfactorily, they require outside equipment or processes in order to function and/or be readable. That is, one cannot detect merely by visually observing the exposed material, the level of absorbed radiation.

It also is known to make dosimeters having a substance which changes color when exposed to ionizing radiation. For example, in U.S. Pat. No. 4,001,587 to Georgy Mitrofanovich Panchenkov et al dated Jan. 4, 1977, dosimeters are disclosed which incorporate various dyes, some acid-sensitive and some not acid-sensitive, which change their color on exposure to radiation. Generally, one requires the use of outside equipment, such as a spectrophotometer, to determine the level of radiation.

In U.S. Pat. No. 4,125,534 to Kwok C. Yee dated Nov. 14, 1978, there is disclosed that diacetylenes are known to react upon exposure to high energy irradiation, such as gamma rays, and undergo a color change indicating polymerization. However, here again, the use of a spectrophotometer is generally required for determining dosage.

In U.S. Pat. No. 4,389,217 to Ray H. Baughman et al dated June 21, 1983, the indicator comprises a substrate having deposited thereon at least two indicating units capable of color change upon thermal annealing or exposure to actinic radiation. One indicating unit is unreacted and represents zero time of exposure and the other of such units is pre-reacted to a known extent whereby the time required by each unit to form the end-point color at a given average radiation dosage rate is predetermined.

In U.S. Pat. No. 4,494,003 to Adolph G. Hager et al dated Jan. 15, 1985, there is disclosed the use of glass doped with iron or manganese which is exposed to gamma radiation. The amount of gamma radiation detected by the glass is measured by an instrument providing a fixed, calibrated source of light. That is, one can measure the attenuation of light transmitted through the gamma irradiated sample of glass as a function of gamma dosage, or one can measure the amount of gamma radiation as a function of the change in the index of refraction of light transmitted through the irradiated sample of glass. The amount of radiation also can be measured by comparison with a color chart.

In U.S. Pat. No. 4,788,126 to Lyudmila Feldman et al dated Nov. 29, 1988, there is disclosed as prior knowledge that some type of dosimeters require chemical processing, either in a laboratory or at the place of radiation exposure. This patent provides for microcapsules which are subjected to a rupturing force such that the image-forming agent is released. The color shade or density of such agent is compared with a reference image to determine the amount of exposure.

In U.S. Pat. No. 4,791,155 to David P. Gregory et al dated Dec. 13, 1988, there is disclosed known radiation indicators utilizing acid-sensitive dyes to monitor the radiation.

Still further, in U.S. Pat. No. 3,768,976 to Kwoh H. Hu dated Oct. 30, 1973, there is disclosed a high-temperature integrating indicator in which a redox dye is colored in its reduced state, but which turns clear in the oxidized state due to the diffusion of oxygen into the device over a predetermined time interval. The disappearance of the color reveals a warning message as to the condition of a food product kept under storage to which the indicator is attached.

The present invention improves on the heretofore known dosimeters by providing an indicator which undergoes a color change upon being irradiated to change the visibility of indicia included as part of the indicator. This serves to provide a visual indication, without additional processing or instrumentation, as to whether the substrate to which the indicator is attached has been exposed to a radiation dosage exceeding a predetermined threshold.

SUMMARY OF THE INVENTION

The invention provides a multi-ply radiation dosage indicator, and a method for manufacturing such indicator, which includes a first ply having visible readable indicia thereon. A second ply having a radiation sensitive zone is provided in overlying relation to the indicia of the first ply. The radiation sensitive zone may either be transparent or opaque and is capable of changing its opacity in response to exposure to radiation exceeding a predetermined threshold so as to change the visibility of the indicia.

In one embodiment of the invention, a third ply may be provided overlying the second ply and having a zone through which the visible indicia of the first ply is exposed to view. The third ply also has visible readable indicia thereon positioned adjacent to the viewing zone. The arrangement is such that the indicia of the first ply and the indicia of the third ply together provide a visual readable indication as to whether the indicator has been exposed to a radiation dosage exceeding the predetermined threshold.

If desired, a fourth ply constituting an optical filter may be provided in overlying relation to the indicia of the first ply. This filter, in addition to preventing exposure of the radiation sensitive zone to undesirable radiation, can also serve to enhance the opacity change in the zone.

Still further, a fifth ply constituting a transparent protective outer ply may optionally be provided in overlying relation to the other plies.

For purpose of attaching the indicator to a substrate, the indicator may include a pressure sensitive adhesive ply applied to the bottom of the first ply, with the adhesive ply having a removable release sheet.

In another embodiment, the third ply is eliminated and the indicia that otherwise would have been provided thereon is located on the first ply so as to constitute a ply having first indicia and second indicia thereon. The radiation sensitive zone of the second ply is located in overlying relation to the first indicia and, as previously noted, is capable of changing its opacity to change the visibility of said first indicia. Once, again, the arrangement is such that the first indicia and the second indicia of the first ply together provide a visual readable indication as to whether the indicator has been exposed to a radiation dosage exceeding the predetermined threshold.

An optical filter ply and a transparent protective outer ply may optionally be provided for this embodiment, as was the case with the earlier embodiment, together with a pressure sensitive adhesive ply having a removable release sheet.

In yet another embodiment, the first ply is made from a material which is completely opaque and does not allow the transmission of any light therethrough. This serves to avoid the possible effect of any cumulative light effect on the radiation sensitive zone as a result of light traversing the first ply, albeit in small amounts, which have a cumulative effect on the radiation sensitive zone.

In yet another embodiment, the first and third plies, which sandwich the interlying plies, have areas larger than the interlying plies and borders which overlie the intervening plies so as to envelop them. The borders are sealed together. This serves to avoid leakage of light through the edges of the indicator which can adversely affect the light sensitive zone.

Additional features and advantages of the present invention will become apparent from a consideration of the following detailed description when taken in conjunction with the accompanying drawings.

DESCRIPTION OF THE PREFERRED EMBODIMENTS

Referring to the drawings, and particularly to FIGS. 1-4, numeral 10 represents one embodiment of a radiation dosage indicator constructed in accordance with the present invention. Indicator 10 is formed as a multiply laminate including a first ply 12 having visible indicia 14 thereon. The indicia, as shown, represents letters forming the word "NOT." However, it is within the scope of the invention that the indicia may be symbol or a color, the visibility of which is relied on, as hereinafter described, to provide a visual indication as to whether indicator 10 has been exposed to a radiation dosage exceeding a predetermined threshold.

A second ply 16 of transparent material is provided which defines a radiation sensitive ply having a radiation sensitive zone or surface 18 disposed in overlying relation to the indicia 14 of first ply 12. Radiation sensitive zone 18 is capable of changing opacity in response to exposure to radiation exceeding a predetermined threshold so as to change the visibility of indicia 14. Suitable for use as the second ply 16 are films of a radiation sensitive polyacetylenic system that provides a color change caused by polymerization of a polyacetylene material. Such materials may be crystalline or ordered so as to undergo polymerization resulting in a color change. Such systems are disclosed in U.S. Pat. Nos. 4,066,676; 4,581,315; 3,501,310; 3,501,297;

3,501,303; 3,501,308; 3,772,028; 3,884,791; and 3,954,816.

A third elongated ply 20 may be provided in overlying relation to plies 12 and 16. The third ply 20 is formed having a viewing zone in the form of a cut-out 22 positioned to permit exposure of indicia 14 therethrough. Ply 20 also has visible readable indicia 24 thereon positioned adjacent to viewing zone 22. In the illustrated embodiment, indicia 24 represents letters forming the word "IRRADIATED." The arrangement is such that indicia 14 and indicia 24 together provide a visual readable indication as to whether the indicator has been exposed to a radiation dosage exceeding the predetermined threshold.

Figure 2:
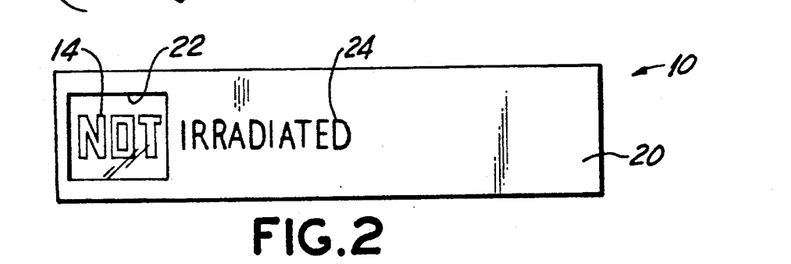
FIG. 2 is a top plan view thereof.
Figure 3:
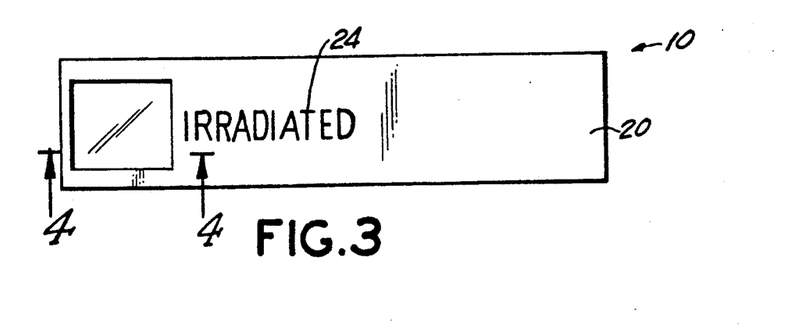
FIG. 3 is a view similar to FIG. 2 wherein the radiation sensitive zone has become sufficiently opaque in response to exposure to radiation to make various indicia of the indicator non-visible.

For example, prior to use, indicia 14 is exposed to view through transparent ply 16 and the cut-out portion 22 of ply 20 so that the combined visible message on indicator 10 reads "NOT IRRADIATED." This visible message serves to indicate that the substrate to which the indicator is attached, e.g., a blood bag, has not been exposed to radiation exceeding a predetermined threshold. However, as a result of exposing indicator 10 to a radiation treatment, the opacity of radiation sensitive zone 18 changes. This change in opacity takes place over the period of irradiation. When the amount of radiation to which the radiation sensitive zone has been exposed reaches the predetermined threshold, zone 18 becomes sufficiently opaque to make indicia 14 non-visible. As a result, the visible message on indicator 10 now constitutes only indicia 24 to indicate that the indicator, and the substrate to which it is attached, has become "IRRADIATED."

It will be appreciated that whereas the invention provides for radiation sensitive zone 18 to become opaque in response to exposure to radiation to make indicia 14 non-visible, it is within the purview of the invention that the zone 18 initially may be opaque and, upon being subjected to radiation, becomes sufficiently transparent thereby to make indicia 14 visible through viewing zone 22. In effect, this would be the reverse operative procedure described above. However, the overall teaching of the invention is the same in that the radiation sensitive zone 18 changes opacity, in one direction or the other, to change the visibility of indicia 14.

Figure 10:
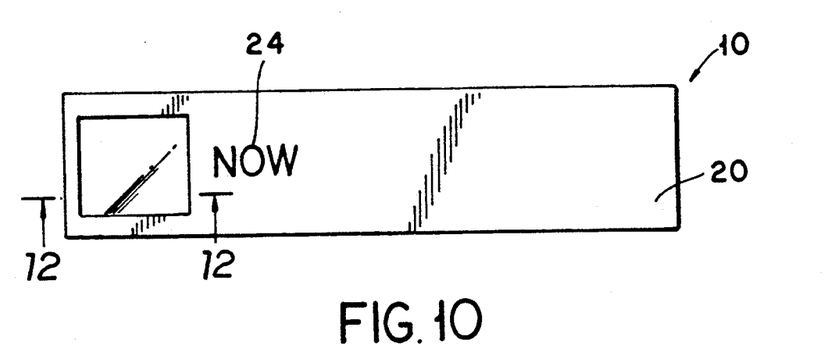
FIG. 10 is a top plane view of an embodiment of the invention wherein the radiation sensitive zone is initially opaque.
Figure 11:
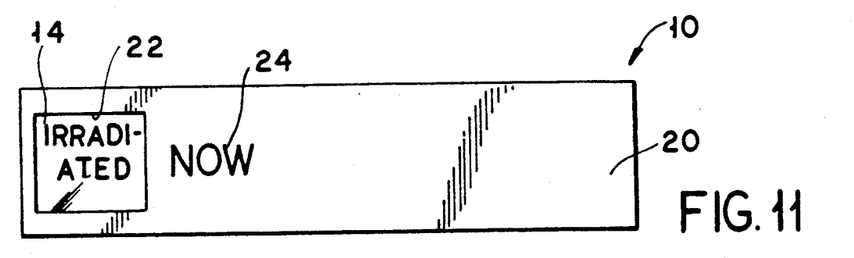
FIG. 11 is a view similar to FIG. 11 wherein the radiation sensitive zone has become sufficiently transparent in response to exposure to radiation to make various indicia of the indicator visible.

Thus, as shown in FIGS. 10 and 11, which are similar to FIGS. 2 and 3, indicia 24, on ply 20 could read "NOW". In the non-irradiated state, the indicia on ply 12 (shown in FIG. 1) would not be visible. However, after irradiation and as shown in FIG. 11, the word "IRRADIATED" shows through viewing zone 22. As a result, the indicia read together "IRRADIATED NOW".

Figures 1, 4:
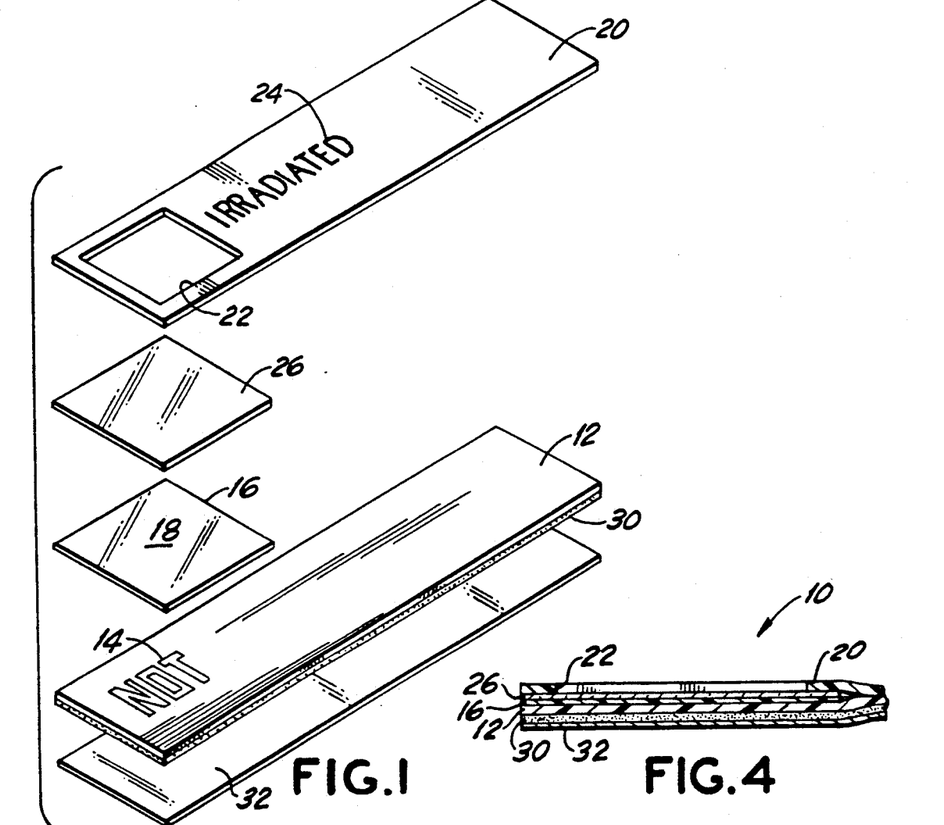
FIG. 1 is an exploded perspective partial view of one embodiment of the radiation dosage indicator constructed in accordance with the present invention.
FIG. 4 is an enlarged sectional view taken along line 4—4 of FIG. 3.

The invention further provides for the inclusion, if desired, of a fourth ply 26 constituting an optical filter overlying the radiation sensitive zone 18. In assembly, filter 26 is sandwiched between the second ply 16 and the third ply 20. Filter 26 is intended as a colored optical filter sheet which may serve one or two purposes.

Specifically, filter ply 26 may firstly serve as an optical filter to prevent exposure of zone 18 to undesirable radiation in a particular part of the spectrum. For example, with a radiation zone designed to be sensitive to electron beam irradiation, it is possible that extraneous radiation present, e.g., ultra-violet, could cause some degree of fogging, which could lead to inaccurate readings of the dosimeter.

Secondly, filter 26 can serve to enhance the opacity change of radiation sensitive zone 18. That is, filter 26 can have an optical absorption complementary to the optical absorption provided by the radiation sensitive ply 16. In a specific example, both the second ply 16 and the filter ply 26 are transparent but have different absorption characteristics at different parts of the spectrum. If we assume that the radiation sensitive zone 18 turns blue upon irradiation, and absent any filter 26, it would be necessary for zone 18 to be exposed to a certain dosage of radiation before becoming sufficiently opaque to render indicia 14 non-visible. However, if we include a red color filter 26 as part of the indicator, then filter 26 complements the blue color of zone 18 so that zone 18 need be exposed to a lesser dosage of irradiation in order to create sufficient opacity to prevent visibility of indicia 14 through the indicator. That is, the presence of filter 26 decreases the radiation dosage needed to achieve opacity.

In practice, ply 26 could constitute a separate coated layer on radiation sensitive ply 16. It is also within the scope of the invention that the desired color of this coating may instead be contained directly in the substrate or in the radiation sensitive coating whereupon ply 16 itself also constitutes a colored filter. For example, the color may be produced by a dye or pigment and the dye or pigment could be mixed in with the radiation sensitive coating or the material making up the substrate. The coated layer, which is represented by ply 26, is of a thickness suitable to produce the required depth of color in the filter and may be in the range from about 0.01 mil to 100 mil, and preferably is from 0.05 mil to 20 mil.

The invention further provides for an optional fifth ply constituting a transparent protective outer ply which would be disposed in overlying relation to third ply 26. The outer ply could serve to prevent indicator 10 from becoming scratched or soiled, and to reduce exposure of the indicator to unwanted ultra-violet light.

Figure 12:
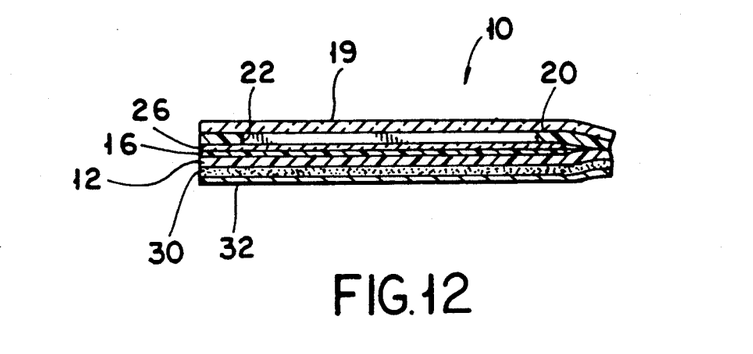
FIG. 12 is an enlarged sectional view taken along the line 12—12 of FIG. 10.

As shown in FIG. 12 which is a view similar to FIG. 4, protective transparent sheet 19 covers ply 20.

In order to permit indicator 10 to be attached to a substrate or other object being subjected to radiation, a pressure sensitive adhesive ply 30 is applied to the bottom of first ply 12. Adhesive ply 30 is provided with a removable release sheet 32 which is adapted to be removed from the adhesive ply when indicator 10 is attached to the substrate.

Aside from adhesive 30, each of the component plies of indicator 10 may be made of plastic or paper or other suitable sheet materials. For example, radiation sensitive ply 16 may be composed of a film substrate having a coating of polyacetylene crystals disposed in a binder. The transparent film substrate preferably is made of polyester but other transparent base materials such as, cellulose acetate, cellulose nitrate, nylon, polystyrene, etc., also would be suitable. Gelatin is used as the preferred binder. However, other suitable binders would include polyvinyl alcohol, polyvinylacetate, modified cellulose or starches, and other film forming materials or mixtures thereof familiar to those skilled in the art. The coating of crystalline polyacetylene may be, for example, pentacosa-10, 12-diynoic acid. The coated layer, which can be applied to one or both sides of the substrate, also may contain small amounts of additives commonly used to facilitate such coating, which additives may include, for example, surfactants, dispersants, leveling aids, viscosity modifiers, and the like.

The thickness of ply 16 should be sufficient to provide mechanical integrity without excessive bulkiness of the dosimeter. The thickness typically might be in the range from about 0.1 mil to 100 mil, and preferably is from about 1 mil to 20 mil. The thickness of the coating is that required to produce the desirable change in opacity and may be in the range from about 0.01 mil to 25 mil, and preferably is from about 0.05 mil to 4 mil. Also, ply 16 itself could be formed as a laminate of multiple plies as noted more fully in connection with the embodiment of FIGS. 5-9.

In manufacturing the laminate constituting indicator 10, the adhesive 30, together with its release sheet 32, is first applied to the bottom surface of ply 12. Ply 16 is then laminated to the top of ply 12 by means of a transparent adhesive bonding. The bottom surface of ply 20 is then laminated to this composite. In those instances where optical filter ply 26 is included as part of the indicator, ply 26 could be laminated to the upper surface of ply 16 and then ply 20 could be laminated to the top of ply 16.

The inventive indicator can be utilized to measure a wide variety of types of electromagnetic radiation including low energy radiation, which is radiation having wave lengths within the visible range, ultra-violet, infra-red, as well as high-energy radiation, i.e., radiation having wave lengths in the range of X-rays, gamma rays, electron beam, and the like (See Encyclopedia of Science & Technology, McGraw-Hill, 1982, Fifth Ed., pp. 627). Typically, for example, the radiation sensitive zone will be sensitive to radiation having an energy level of at least about 1 eV. Understandably, those plies which are interposed between the source of radiation and the radiation sensitive zone, for example, in FIG. 1, ply 26 must be adapted in terms of their thickness and composition so as to allow the specific type of radiation to which the radiation sensitive zone is sensitive and which it is desired to measure, to penetrate. Thus, those plies interposed between the radiation sensitive zone and source of radiation must be transparent to the type of radiation. High energy radiation, e.g., x-rays and gamma-rays are particularly penetrating and, for all practical purposes, will penetrate most materials which might be disposed in front of the radiation sensitive zone. However, for lower energy radiation, e.g., ultra-violet, the plies in front of the radiation zone must be chosen carefully so as not to interfere with the penetration of the radiation wave lengths which it is desired to measure.

Particle radiation, such as, electron beam and alpha particles have an intermediate energy level. Consequently, the thickness of those layers in front of the radiation sensitive zone must be chosen so as to be consistent with the energy level of the particle radiation been measured. Typically, when the inventive dosimeter is to be utilized for material processing or sterilization, an electron beam having an energy level of about 250 KeV or more would be used. Such radiation will penetrate organic plastics, e.g., polyethylene film and the like, up to a thickness of about 20 mil.

The threshold level, i.e., amount of radiation that would cause the radiation sensitive layer to change its opacity sufficiently to make the indicia readable or not readable, will depend upon the specific purpose for which the inventive dosimeter is being used as well as the specific wave length of radiation to which the radiation sensitive layer is sensitive. Typically, for example, for dosimeters used to detect x-rays, gamma rays and electrons, a radiation sensitive layer which changes opacity after a dosage of from about $10^{-3}$ to $10^8$ rads can be used. For certain uses, e.g., blood irradiation, a threshold dosage of from about $10^2$ to $10^4$ rads would be suitable. Particularly suitable would be a threshold dosage of about 1,500 to 4,500 rads.

For a radiation sensitive layer which is responsive to ultra-violet and which would be used for measurement of ultra-violet dosage, dosage levels in the range from about $10^{-8} J/cm^2$ to $10^3 J/cm^2$ would be suitable.

FIGS. 5-9 illustrate another embodiment of the invention represented by indicator 40 which, similar to indicator 10, also is formed as a multiply laminate. For this embodiment, what was previously identified as the third ply 20 has been eliminated and the indicia 24 thereon is now incorporated on the base or first ply 42.

Figure 5:
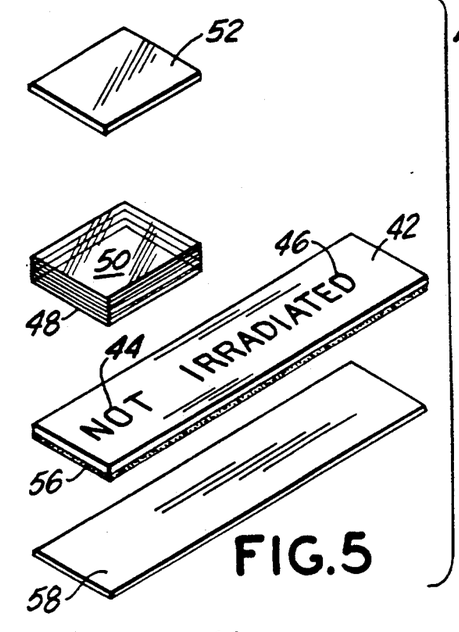
FIG. 5 is an exploded perspective view of another embodiment of the radiation dosage indicator of the present invention.

Specifically, ply 42 is made of material having first visible indicia 44 thereon forming the word "NOT." Here, again, indicia 44 may be a symbol or a color similar to indicia 14 of the first embodiment, the visibility of which is relied on to provide a visual indication as to whether indicator 40 has been exposed to a radiation dosage exceeding a predetermined threshold.

Ply 42 also has second visible readable indicia 46 thereon forming the word "IRRADIATED." Indicia 46 is positioned adjacent to indicia 44 and, taken together with indicia 44, provide a visual readable indication as to whether indicator 40, and the substrate to which it is attached, is irradiated.

A second ply 48 of transparent material is provided which defines the radiation sensitive ply having a radiation sensitive zone or surface 50 disposed in overlying relation to the indicia 44 of first ply 42. As was the case with the first embodiment of FIGS. 1-4, radiation sensitive zone 50 is capable of changing opacity in response to exposure to a radiation dosage exceeding a predetermined threshold so as to change the visibility of indicia 44.

Figure 6:
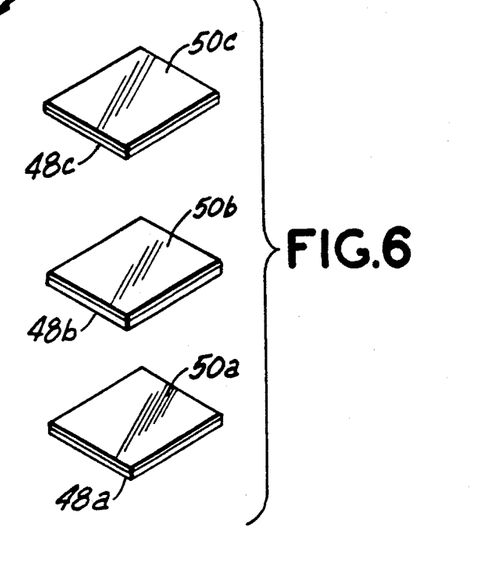
FIG. 6 is an exploded perspective view just of the radiation sensitive ply of FIG. 5 which is formed as a laminate of multiple plies.

As previously noted, the radiation sensitive plies 16, 48 may be constructed of multiple plies, each having a radiation sensitive zone. This is shown in FIG. 6 wherein ply 48 is formed as a laminate of separate plies 48a, 48b and 48c, have the radiation sensitive zones 50a, 50b and 50c, respectively. The thickness of the plies 48a 48b and 48c collectively is within the range of ply 16. The thickness of each of the polyester plies forming the laminate 48 is approximately 4 mil and the thickness of the crystalline polyacetylene coating is approximately 1 mil.

An optical filter ply 52, similar to filter ply 26, is provided overlying the radiation sensitive ply 48. In practice, filter ply 52 is a suitably colored coating on ply 48.

In order to permit indicator 40 to be attached to a substrate or other object being subjected to radiation, a pressure sensitive adhesive ply 56 is applied to the bottom of ply 42. Adhesive ply 56 is provided with a removable release sheet 58 which is adapted to be removed from the adhesive ply when indicator 40 is attached to the substrate. The manufacture of indicator 40 is analogous to that of indicator 10 with the exception of ply 20.

Adhesive ply 56 may extend over the entire length of indicator 40 to facilitate the indicator being more securely affixed to the substrate.

Figure 7:
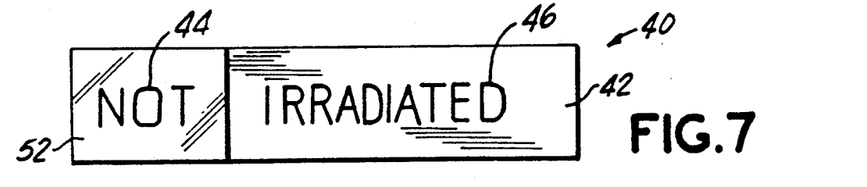
FIG. 7 is a top plan view of the radiation dosage indicator of FIG. 5.

In use, consider the situation where indicia 44 is exposed to view so that the combined visible message on indicator 40 reads "NOT IRRADIATED."

Figure 8:
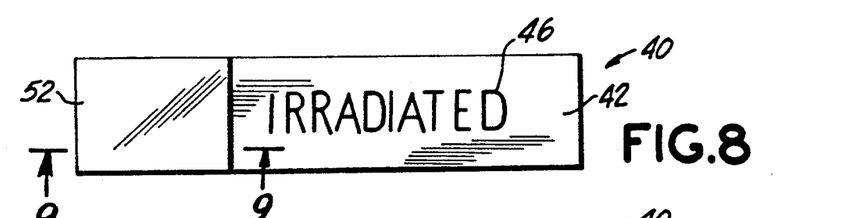
FIG. 8 is a view similar to FIG. 7 wherein the radiation sensitive zone has become sufficiently opaque in response to exposure to radiation to make various indicia of the indicator non-visible.
Figure 9:
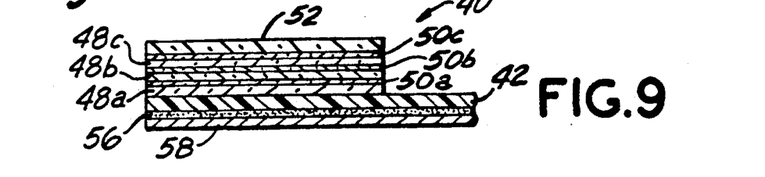
FIG. 9 is a sectional view taken along line 9—9 of FIG. 8.

However, as the indicator is exposed the opacity of radiation sensitive zone 50 (that is, zones 50a, 50b and 50c) changes. When the radiation dosage exceeds a predetermined threshold, zone 50 becomes sufficiently opaque to make indicia 44 non-visible, as shown in FIG. 8. As a result, the visible message on indicator 40 now constitutes only indicia 46 to indicate that the indicator, and the substrate to which it is attached, has become "IRRADIATED."

There is thus provided a novel radiation dosage indicator which operatively is a passive device; that is, it does not require any external equipment or procedure in order to indicate when the substrate has been exposed to a radiation dosage exceeding a predetermined threshold. There is no separate chemical processing, developing or heating required in order for the indicator to function. The indicia is easily and instantaneously readable, and provides a permanent record as to the radiation exposure. That is, once the indicator indicates that the substrate has become irradiated, the indicator can be suitably marked and stored for future reference. The indicator does not have to be exposed to any chemical developer nor be exposed to a vapor or gas or etchant liquid.

In the embodiments depicted and described hereinabove, the edges of the various plies are all in register. This can be seen, in particular, from FIGS. 1, 4, 9, 10 and 11. However, we have found, that in certain instances, it is possible that very small amounts of ambient light striking the surface of the plies may seep through ply 20 and/or ply 12. Thus, while these plies may ordinarily, be made of paper or plastic material which may be filled with an opaquing pigment, for example, titanium dioxide and the like, such papers are not completely opaque to light. Over extended periods of time under ambient lighting, it is possible for small amounts of light to be transmitted through such plies.

Referring to FIGS. 1-4, in instances where an optical filter ply 26 is employed above the radiation sensitive ply 16, the seepage of ambient light through ply 20 may cause changes in the opacity of radiation sensitive zone. However, the entry of light through the ply 12 can also have an acute adverse effect if the dosimeter label is attached to a transparent substrate. We have found, for example, that after about twenty days, it is possible for a sufficient amount of light to be transmitted through such a ply so as to result in an undesirable change in visibility of the radiation sensitive zone.

As a result, we have particularly discovered that it is best if the outer plies, such as plies 20 and 12, be made of a completely opaque material, for example, a metallic foil, black plastic tape, e.g., so called "electrical tape" or a metallic foil coated paper or plastic.

To demonstrate this phenomenon, two dosimeters having the embodiment of FIG. 1, with the exception that adhesive layer 30 and release layer 32 were not present, were placed in side-by-side relationship on an opaque support sheet. The dosimeters were modified in that an opaque, black plastic tape was placed on the exterior surface of ply 12 (that surface which would normally be covered with adhesive) such that it was opposite to and overlaid one-half of the radiation sensitive zone 18 (ply 16) which is on the opposite side of ply 12. Thus, the covered portion of zone 18 was shielded from illumination. The dosimeters were placed facedown, i.e., with ply 20, contacting the support surface. The support was mounted approximately 4 inches below the center of a cool-white fluorescent light source so that ply 12 faced the light and was illuminated. The power density in the visual spectrum at the sample level was measured to be approximately 60 microwatts/cm$^2$. The indicators were exposed to this light source for twenty-one days. Inspection of the indicators after the test period showed that the indicia in that portion of the radiation sensitive zone covered by the opaque tape were still clearly and distinctly visible. In contrast, in the adjacent, unprotected zone (the zone not covered with the tape), the indicia had been rendered totally invisible. This demonstrates that the radiation sensitive zone is affected by light in the visible spectrum when subjected to such light over an extended period of time. It further shows that this sensitivity can be counteracted by making certain that the first ply is completely opaque.

We have also found that for embodiments such as those depicted in FIGS. 1, 4, 5 and 9, wherein the edges of each of the plies or radiation sensitive zone are in register, it is possible for light leakage or "piping" to occur through the edges of the plies. Thus, for example, it is possible for ambient light striking the edges, to enter into the laminate through the side edges of those plies which may be partially or completely transparent to light. As a result, if the first ply is made of paper or a plastic, light can seep into the laminate through the edge and, over an extended period of time, adversely affect the radiation sensitive zone. As a result, this detrimentally affects the long term storage properties of such laminates.

We have further discovered that this can be avoided by making the first and third plies larger in area than the intermediate plies. This results in the borders of the first and third plies extending beyond the edges of the intermediate plies and allows these borders to be sealed together thereby completely enclosing or enveloping the intermediate plies. Further, when the first and third plies are formed from a completely opaque material, i.e., a black electrical-type tape or a foil coated paper or plastic, and the edges are sealed together, resulting in complete encapsulation, of the intermediate plies including the radiation sensitive zone, the light leakage can be completely avoided.

Figure 13:
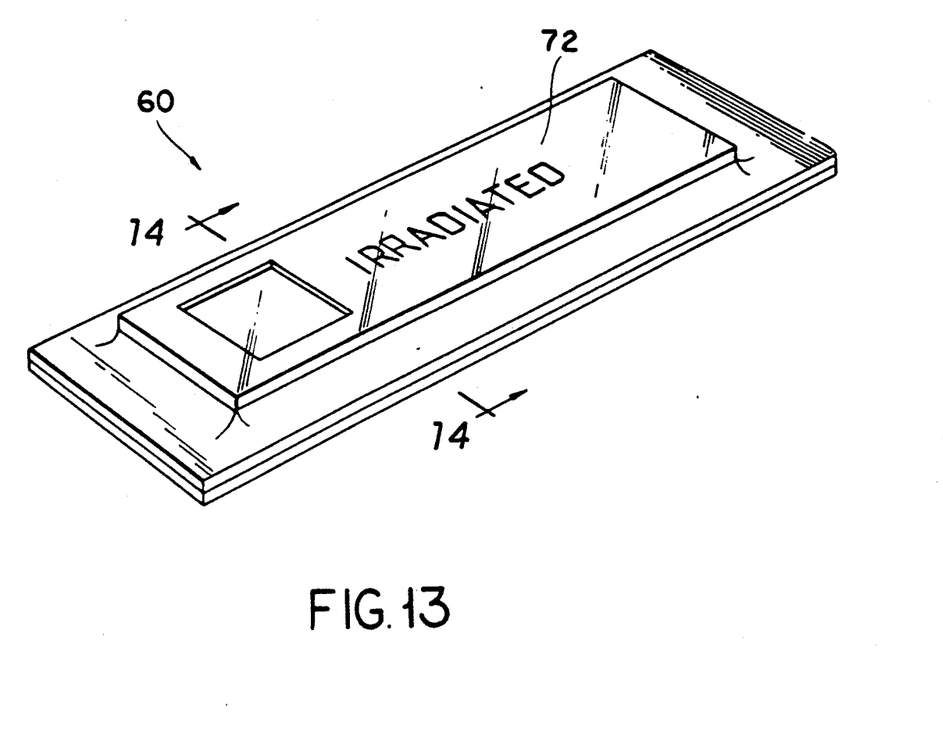
FIG. 13 is a perspective view of another embodiment of the invention.
Figure 14:
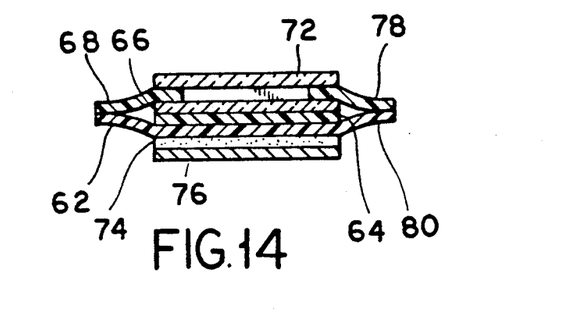
FIG. 14 is an enlarged sectional view taken along the line 14—14 of FIG. 13.

FIGS. 13 and 14 depict an embodiment of the inventive dosimeter which provides protection against ambient light affecting the radiation sensitive zone either by passage through the first or third or outer plies and/or leakage through the edges of the laminate. As shown therein, radiation dosage indicator 60 has a constitution similar to that shown in FIGS. 1 and 4. Referring specifically to FIG. 14, a first ply 62 having indicia thereon is shown. This ply corresponds to ply 12 of FIG. 1. A second ply 64 is shown on top of ply 62 which corresponds to ply 16 of FIG. 1. This ply contains a radiation sensitive zone corresponding to radiation sensitive zone 18 of FIG. 1. A third ply 66, overlying the radiation sensitive zone of ply 64 and constituting a filter corresponding to filter 26 of FIG. 1, is applied onto ply 64. Thereafter in overlying relationship to plies 64 and 66, a fourth elongated ply 68 is shown corresponding to ply 20 of FIG. 1. This ply has a cut-out portion 70 constituting a viewing zone similar to cut-out zone 22 of FIG. 1.

Also shown is a top protective transparent ply 72, an adhesive ply 74 and release sheet ply 76 corresponding to the same respective plies as shown in FIG. 4 as well as FIG. 10.

Of importance in FIGS. 13 and 14 is the fact that plies 62 and 68 having dimensions which are greater in both their length and width than intervening plies 66 and 64. This allows the border portions 78 of ply 68, and 80 of ply 62 to overhang intervening plies 64 and 66 on all sides. The overhanging border portions 78 and 80 are then married together so as to completely seal intervening plies 64 and 66 and form an encasement or envelope therefor. Overlapping portions 78 and 80 are sealed together as by an adhesive, heat, or other means so as to make the interface thereof impervious to light. In addition, plies 62 and 68 are formed from a completely opaque material, such as, a black plastic tape, foil or foil coated paper. As a result, in this embodiment, ambient light is completely prevented from leakage into the encased portion of plies 62 and 68, thus avoiding irradiation of radiation sensitive zone 70 by small but incremental amounts of ambient light. In particular, this embodiment assures that light cannot leak into the interior of the dosimeter through the edges.

The improvement obtained by this embodiment has been demonstrated by placing three radiation dosage indicators face up (window side up) on an opaque support. The first indicator was constructed in accordance with FIG. 1 wherein the edges of the radiation sensitive zone were in register with the edges of the other plies and were exposed to incident illumination. The second indicator was constructed in accordance with FIG. 14, with the first and third plies being translucent, and extending to cover the edges of the radiation sensitive zone. The third indicator was constructed similarly to the second except that the first and third plies were completely opaque thereby shielding the edges of the radiation sensitive zone from illumination.

The support was mounted approximately 22" below a cool-white fluorescent light source. The power density in the visual spectrum at the plane of the samples was measured and was approximately 48 microwatts/cm$^2$. The radiation dosage indicators were exposed to this light source for approximately 48 days. At the conclusion of the test, the indicators were inspected and the following observations were made:

The radiation sensitive zone of the first indicator had darkened sufficiently such that the underlying indicia were barely visible. Similarly, the radiation sensitive zone of the second indicator had darkened such that its indicia were barely visible. The third indicator in accordance with the above described embodiment, showed no appreciable darkening of the radiation sensitive zone and its indicia were clearly visible While preferred embodiments of the invention have been shown and described in detail, it will be readily understood and appreciated that numerous omissions, changes and additions may be made without departing from the spirit and scope of the invention.

We claim:

1. A multi-ply radiation dosage indicator comprising:
a first ply having visible indicia thereon;
a second ply having a radiation sensitive zone overlying the indicia of said first ply; said radiation sensitive zone being capable of changing opacity in response to exposure to a radiation dosage exceeding a predetermined threshold so as to change the visibility of the indicia; and
a third ply overlying said second ply and having a viewing zone through which the visible indicator of said first ply is exposed to view, said first and third plies being opaque and having border portions extending beyond the intervening plies, the border portion of the first ply being attached to the border portion of the third ply so as to seal the edges of the intervening plies from exposure to ambient light.

2. The indicator of claim 1, wherein said radiation sensitive zone is transparent and becomes sufficiently opaque in response to exposure to radiation to make the indicia non-visible.

3. The indicator of claim 1, wherein said radiation sensitive zone is opaque and becomes sufficiently transparent in response to exposure to radiation to make the indicia visible.

4. The indicator of claim 1, further comprising an optical filter ply overlying said second ply.

5. The indicator of claim 1, further comprising a transparent protective outer ply.

6. The indicator of claim 1, wherein said third ply further comprises a visible indicia positioned thereon adjacent to said viewing zone, the indicia of said first ply and the indicia of said third ply together providing a visual indication as to whether said indicator has been exposed to a radiation dosage exceeding the predetermined threshold.

7. The indicator of claim 6, wherein said third ply has a cut-out window defining said viewing zone.

8. The indicator of claim 6, further comprising a fourth ply constituting an optical filter overlying said second ply.

9. The indicator of claim 1, wherein said first ply has second visible indicia thereon positioned adjacent to the first indicia, the first indicia and the second indicia together providing a visual indication as to whether said indicator has been exposed to a radiation dosage exceeding the predetermined threshold.

10. The indicator of claim 9, further comprising an optical filter ply overlying said second ply.

11. The indicator of claim 1, further comprising means to attach said indicator to a substrate.

12. The indicator of claim 11, wherein said means comprises a pressure sensitive adhesive ply and a removable release sheet.

13. A multi-ply radiation dosage indicator comprising:
a first ply having visible readable indicia thereon;
a second ply having a radiation sensitive zone overlying the indicia of said first ply;
said radiation sensitive zone being transparent and becoming sufficiently opaque in response to exposure to a radiation dosage exceeding a predetermined threshold to make the indicia of the first ply non-visible;
a third ply overlying said second ply and having a zone through which the visible indicia of said first ply is exposed to view, said third ply having visible readable indicia thereon positioned adjacent to said viewing zone, the indicia of said first ply and the indicia of said third ply together providing a visual readable indication as to whether said indicator has been exposed to a radiation dosage exceeding the predetermined threshold;
a fourth ply constituting an optical filter overlying said radiation sensitive zone; and means to attach said indicator to a substrate, and wherein the first and third plies are opaque and have border portions extending beyond the intervening plies, the border portion of the first ply being attached to the border portion of the third ply so as to seal the edges of the intervening plies from exposure to ambient light.

14. The indicator of claim 13, wherein said means comprises a pressure sensitive adhesive ply and a removable release sheet.

15. A multi-ply radiation dosage indicator comprising:
a first ply having first visible readable indicia and second visible readable indicia thereon, said second indicia positioned adjacent to said first indicia;
a second ply having a radiation sensitive zone overlying the first indicia of said first ply;
said second ply being transparent and said radiation sensitive zone becoming sufficiently opaque in response to exposure to a radiation dosage exceeding a predetermined threshold to make the first indicia non-visible and provide a visual readable indication that said indicator has been exposed to a radiation dosage exceeding the predetermined threshold;
an optical filter overlying said second ply;
a third ply overlying said optical filter and having a zone through which the first visible readable indicia of said first ply is exposed to view; and
means to attach said indicator to a substrate and said first and third plies being opaque and having border portions extending beyond the intervening plies, the border portion of the first ply being attached to the border portion of the third ply so as to seal the edges of the intervening plies from exposure to ambient light.

16. The indicator of claim 13 or 15, wherein said second ply is a laminate of multiple layers, each having a radiation sensitive zone in overlying relation to each other.

17. The indicator of claim 1, 13, or 15 wherein the radiation sensitive zone is sensitive to radiation having an energy level of at least from about 1 eV.

18. The indicator of claim 17, wherein the sensitive zone is sensitive to high energy radiation and the threshold dosage is in the range from about $10^2$ to $10^4$ rads.

19. The indicator of claim 17, wherein the sensitive zone is sensitive to high energy radiation and the threshold dosage is in the range from about 1,500 to 4,500 rads.

20. The indicator of claim 17, wherein the sensitive zone is sensitive to low energy radiation and the threshold dosage is in the range from about $10^{-8} J/cm^2$ to $10^3 J/cm^2$.

21. The indicator of claim 17, wherein the sensitive zone is sensitive to high energy radiation and the threshold dosage is in the range from about $10^{-3}$ to $10^8$ rads.

22. The indicator of claim 21, wherein the radiation sensitive zone comprises a polyacetylene compound.

23. A method for making a multi-ply radiation dosage indicator comprising:
a first ply having visible indicia thereon;
a second ply having a radiation sensitive zone overlying the indicia of said first ply; said radiation sensitive zone being capable of changing opacity in response to exposure to a radiation dosage exceeding a predetermined threshold so as to change the visibility of the indicia; and
a third ply overlying said second ply and having a viewing zone through which the visible indicator of said first ply is exposed to view, said first and third plies being opaque and having border portions extending beyond the intervening plies, the border portion of the first ply being attached to the border portion of the third ply so as to seal the edges of the intervening plies from exposure to ambient light comprising the steps of:
laminating a first ply of said multi-ply indicator to a second ply of said indicator, said first ply having visible indicia thereon and said second ply having a radiation sensitive zone overlying the indicia of said first ply, said radiation sensitive zone being capable of changing opacity in response to exposure to a radiation dosage exceeding a predetermined threshold; laminating a third ply in overlying relationship to the second ply, the third ply having a viewing zone through which the visible indicator of the first ply is exposed to view; and
attaching the border portion of the first and third plies to each other to seal the edge of the intervening plies from exposure to ambient light.

24. The method of claim 23, wherein said radiation sensitive zone is transparent and becomes sufficiently opaque in response to exposure to a radiation dosage to make the indicia non-visible.

25. The method of claim 23, further comprising the step of laminating a third ply of said indicator to said first and second plies with said second ply sandwiched between said first ply and said third ply, said third ply having a zone through which the visible indicia of said first ply is exposed to view, said third ply having visible indicia thereon positioned adjacent to said viewing zone, the indicia of said first ply and the indicia of said third ply together providing a visual indication as to whether said indicator has been exposed to a radiation dosage exceeding the predetermined threshold.

26. The method of claim 25, further comprising the step of laminating an optical filter ply to said second ply prior to laminating said first and second plies to said third ply, said filter ply being sandwiched between said second ply and said third ply and overlying said radiation sensitive zone.

27. The method of claim 26, further comprising the step of laminating a transparent protective outer ply to said third ply in overlying relation thereto.

28. The method of claim 27, further comprising the step of applying a pressure sensitive adhesive ply to the bottom of said first ply for attaching said indicator to a substrate, said adhesive ply including a removable release sheet.

* * * * *